July 14, 1953 H. A. COOK 2,645,518
OCCUPANT COMPARTMENT SUPERIMPOSED ON VEHICLE BODY
Original Filed June 30, 1948 2 Sheets-Sheet 1

Inventor
HARVEY A. COOK

July 14, 1953  H. A. COOK  2,645,518
OCCUPANT COMPARTMENT SUPERIMPOSED ON VEHICLE BODY
Original Filed June 30, 1948  2 Sheets-Sheet 2

Inventor
HARVEY A. COOK
By Geo. B. Pitts
Attorney

Patented July 14, 1953

2,645,518

UNITED STATES PATENT OFFICE 2,645,518

OCCUPANT COMPARTMENT SUPERIMPOSED ON VEHICLE BODY

Harvey A. Cook, University Heights, Ohio

Original application June 30, 1948, Serial No. 36,012. Divided and this application August 23, 1950, Serial No. 181,008

1 Claim. (Cl. 296—23)

This invention relates to a vehicle consisting of (a) a conventional closed type of body mounted on a pair of front steering wheels and a pair of rear wheels, by preference the latter pair of wheels being driven, and (b) a non-collapsible structure having side and end walls removably engaging the walls of the closed body to provide an auxiliary closed compartment. When the rigid structure is mounted on the closed body a unitary multi-compartment passenger vehicle results, each compartment being adapted for human occupancy, as later set forth. This form of construction enables one or more passengers to drive cross country or tour from place to place in a convenient manner with many of the problems incident to such activity entirely avoided for the reason that sleeping quarters and other facilities for the passenger or passengers are provided and the employment of a trailer is eliminated. As the removable section is fixedly related to and entirely mounted on the main section or body of the passenger automobile the entire unit occupies a minimum space when parked and on the road when the vehicle is in motion, facilitates backing and maneuvering in any direction, the vehicle engine has less weight to transport and therefore is more economical in fuel and oil consumption, and parking and driving on roads and in congested traffic conditions are materially simplified.

One object of the invention is to provide an improved light weight closed non-collapsible body adapted to be detachably mounted on various conventional types of passenger vehicles having travel facilities including sleeping, dressing, eating and storage equipment usually employed in a trailer.

Another object of the invention is to provide an improved vehicle having closed non-collapsible human occupancy compartments, one compartment consisting of a conventional automobile and the other having sleeping and other equipment, detachably or removably mounted on the vehicle body.

Another object of the invention is to provide an improved passenger vehicle consisting of a closed main or self-propelled human occupany body and a removable non-collapsible structure having a sleeping section and a utility section.

Another object of the invention is to provide an improved closed non-collapsible body having sleeping and other equipment adapted to be removably mounted on a standardized closed body of a passenger vehicle and forming therewith a unitary wheel mounted structure.

Another object of the invention is to provide an improved non-collapsible closed body shaped to be removably mounted on the top and rearward portion of the closed passenger body of a vehicle and providing in its interior sleeping and other equipment, while permitting access to the rear compartment of the automobile.

Another object of the invention is to provide an improved closed body member adapted to be removably mounted on the top and rearward portion of the body of a self-propelled vehicle, the walls of the body member being provided with means to effect a sealing relation with the surfaces of the vehicle body, whereby the body member affords comfortable use under various weather conditions.

Another object of the invention is to provide an improved closed non-collapsible body member adapted to be removably mounted on the closed body of a passenger vehicle, shaped to extend over the top and tail portion of the vehicle body with a minimized overhang rearward of the latter.

Another object of the invention is to provide an improved closed body member adapted to be removably mounted on the closed body of a vehicle and containing a sleeping section and a utility section.

Other objects of the invention will be apparent to those skilled in the art to which my invention relates from the following description taken in connection with the accompanying drawings, wherein Fig. 1 is a side elevation of a vehicle embodying my invention, parts being broken away;

Figure 1:
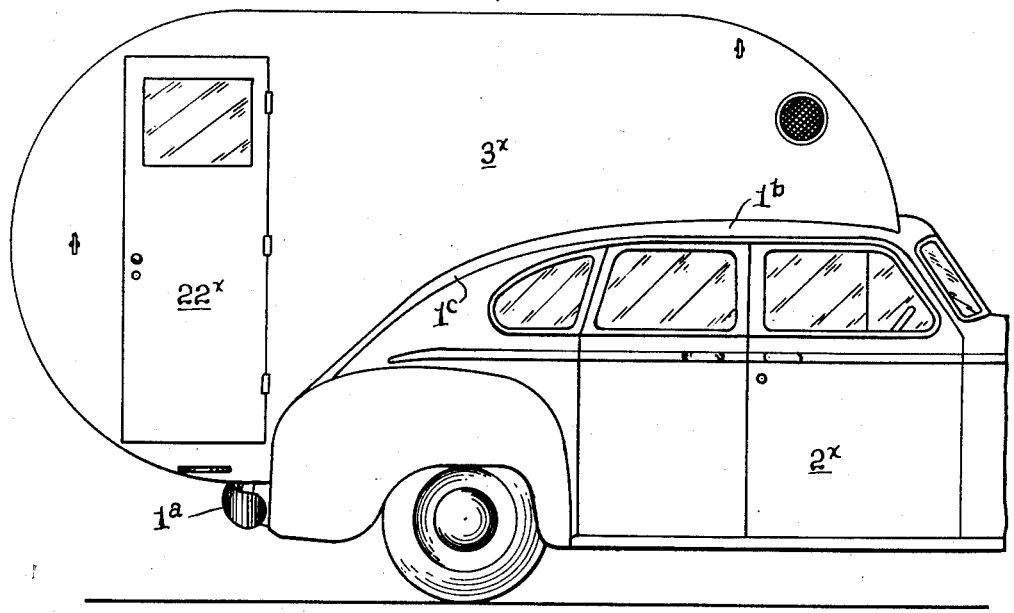
Figure 2:
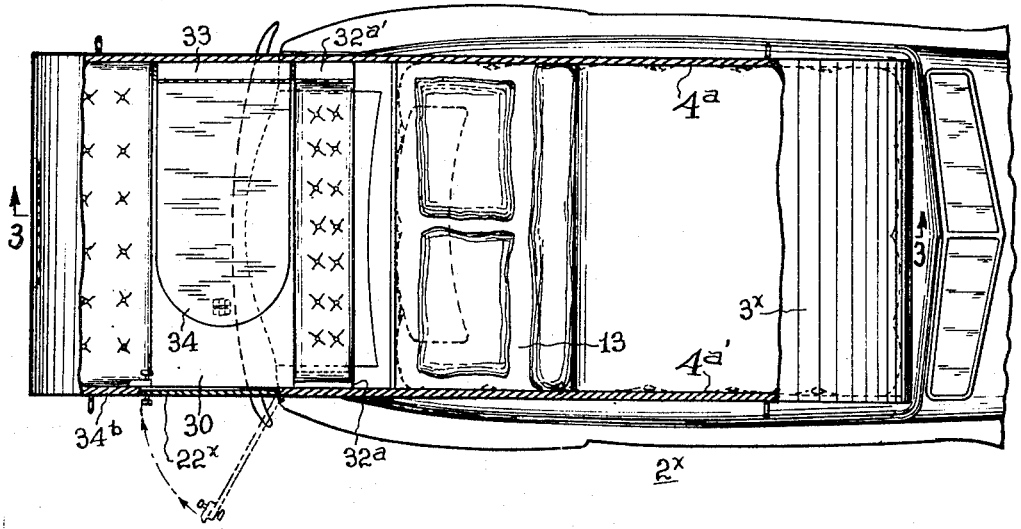
Fig. 2 is a section on the line 2—2 of Fig. 3.
Figure 3:
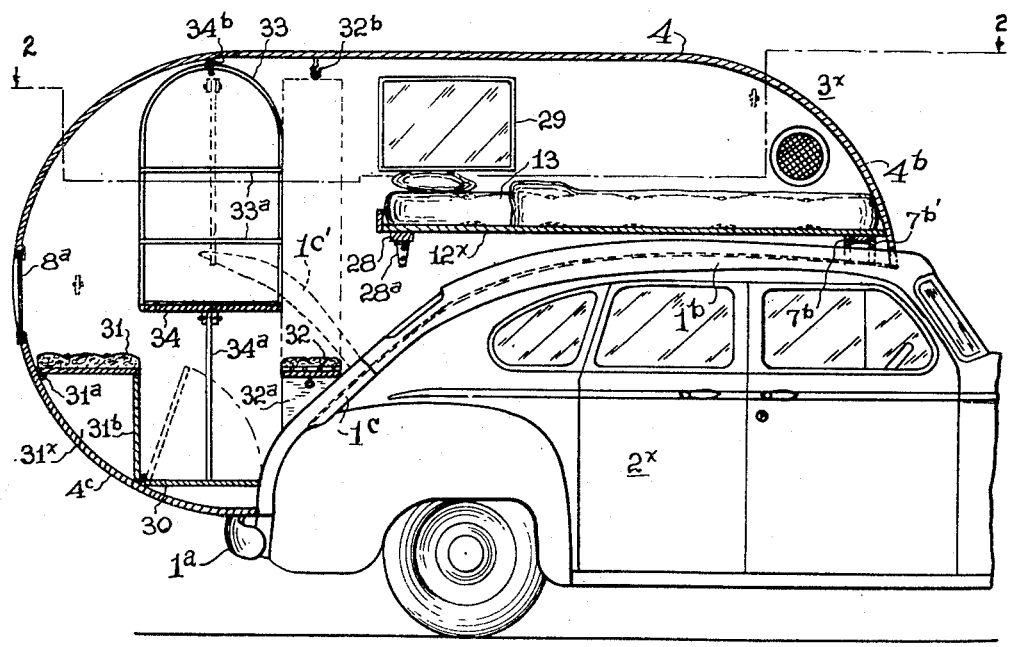
Fig. 3 is a view showing the passenger vehicle in side elevation and the non-collapsible auxiliary compartment in section on the line 3—3 of Fig. 2.

In the drawings, 1 indicates as an entirety a self-propelled passenger vehicle of the closed body type, the vehicle chassis supporting the body 2x and provided with a bumper 1a. The body 2x has a top 1b contiguous to the tail portion 1c. The tail portion 1c encloses a suitable compartment having a door 1c' adapted to be raised as shown in dotted lines (Fig. 3).

3x indicates as an entirety a closed, non-collapsible body removably mounted on the body 2x. While the body 3x overhangs the rear end of the body 2x, it is entirely supported on the latter to provide a duplex body structure mounted on one set of wheels. The body 3x preferably consists of a skeleton frame having rigid top and side and end walls, shown diagrammatically, as disclosed in my original application, Ser. No. 36,012, filed June 30, 1948, now Patent No. 2,614,882. The body 3x consists of a top wall 4, side walls 4a, 4a', a front end wall 4b and a rear wall 4c preferably of arcuate shape. The lower or marginal edges of these walls are substantially complementary to the top 1b and tail portion 1c and provided throughout their length with suitable cellulose webbing or like material to form a seal between the body 3x and the body 2x as well as to protect the surface of the latter. In this arrangement the non-collapsible auxiliary body 3x is closed, to eliminate the elements and wind and thus insures its occupants at all times with comfort and safety.

12x indicates a support for the mattress 13. The support 12x is mounted at its front end on the cross members 7b, 7b', and at its rear end on a transverse sill 28 supported at its opposite ends on brackets 28a. The support 12x is of a length longitudinally of the vehicle to mount a full length mattress 13. In this arrangement, the top wall 4 of the body 3x is suitably spaced from the support 12x to give head room above the latter. Either or both side walls of the body 3x may be provided with a window 29. Within the rear portion of the body 3x and adjacent the lower end portion of the rear wall 4c I provide a flooring 30 extending between the side walls of the body and rear and front seats 31, 32, at opposite sides of and above the flooring. The flooring 30 is hinged along its rear end and swingable upwardly, and the seat 32 is hinged to a bracket 32a' on the side wall 4a and swingable upwardly, as shown in dotted lines, to permit opening of the door 1c' for the compartment in the rear of the vehicle 2x. By providing the non-collapsible body 3x with an overhang and extending the end wall 4c thereof downwardly and inwardly into engagement with the tail portion 1c, the flooring 30 is disposed at a low level to facilitate ingress and egress and also insures head room below the top 4 and between seats when a person is standing on the flooring and hence retiring at night and re-robing in the morning is facilitated. In this form of construction the door 22x, which provides ingress and egress, extends from the flooring 30 to a point adjacent the top wall of the body 3x. The seat 31 is hinged at 31a to the rear wall 4c and co-operates with a vertical wall 31b to provide an accessible storage space 31x. That end of the seat 32 adjacent the door 22x rests on a ledge 32a fixed to the side wall of the body; and when the seat 32 is swung upwardly into its non-use position it may be detachably secured to the wall 4a by related devices 32b. The displacement of the seat 32 permits the compartment door 1c' to be opened, whereby free access to the compartment in the tail portion 1c results. The seat 32 may be used as a support to facilitate getting into bed and back therefrom. The side wall opposite the door 22x is provided with a cupboard 33, the shelves 33a of which are adapted to support edibles and eating equipment. The cupboard is closed by a board 34, hinged along its lower end to the bottom wall of the cupboard to permit it to swing to the position shown in Fig. 3 in relation to the seats 31, 32, and serve as a table. The outer side of the board 34 is provided with a pivoted leg 34a. The board 34 is held in its up position by a suitable latch 34b.

In the arrangement shown, that portion of the non-collapsible body 3x associated with and lying over the top 1b of the body 2x serves as a resting or sleeping section, whereas the overhang portion of the body 3x provides a utility section wherein working, writing, reading, visiting and other activities, as well as eating, may be enjoyed.

It will be noted that the end wall 4c of the body 3x is provided with a window 8a in alinement with the rear window of the body 2x to provide a rear view for the driver in the latter body.

Current for the fan motors and electric bulbs may be supplied by batteries (not shown) or the battery mounted on the vehicle chassis. When the vehicle is parked on a lot provided with electric current supply equipment, these electric devices may be connected therewith.

It will be observed that I provide a vehicle having a body consisting of two closed sections, one usable for driving and the other usable for resting and privacy, and mounted on pairs of front and rear wheels, one pair of which is driven and one pair being steerable. Thus it will be observed that the vehicle may be advantageously employed for overnight trips and trips of longer duration, conveniently and economically.

It will also be observed that the removable section terminates at its front end on the top of the main section inwardly of the windshield thereof, so that driving vision is not impaired; also, that the removable body section overhangs the rear of the main body section a minimum distance. As the width of the removable body section is reduced as compared to that of the automobile on which it is mounted, the turning radius of the vehicle is not increased. The removable body is relatively light and when mounted in position the gross weight of the vehicle (including four passengers) is increased approximately 8% and the center of gravity of the vehicle is shifted but approximately seven inches rearwardly. It will thus be seen that the increased weight is so distributed that driving and steering of the vehicle is not unduly affected and strains and distortion on the body, chassis and running gear of the automobile are reduced to a minimum.

The construction may be advantageously used since the usuable area (bed and luggage supports) of the removable section measures 150% of the usable floor area of the automobile. This increase in usable space is obtained with minimum overhang at the rear and with less than 400 pounds increased weight.

To those skilled in the art to which my invention relates many changes in construction and widely differing embodiments and applications of the invention will be apparent without departing from the spirit and scope thereof. My disclosures and the description herein are purely illustrative and not intended to be in any sense limiting.

This application is a division of my aforesaid co-pending application filed June 30, 1948, Ser. No. 36,012, now Letters Patent No. 2,614,882, dated October 21, 1952.

What I claim is:

A non-collapsible human occupancy structure adapted to be removably mounted on the conventional closed body of a passenger vehicle the rear portion of which is provided with a compartment and a door therefor, said structure extending longitudinally of the passenger body and consisting of top, front, side and rear walls, the terminating ends of said walls being shaped to snugly fit contiguous portions of the vehicle body, whereby said structure is closed, said rear wall extending outwardly beyond the vehicle body and downwardly and inwardly for engagement with the rear end wall of the vehicle body to provide therewithin a utility section, a transversely disposed flooring for the utility section disposed adjacent the inwardly extending portion of said rear wall, a transversely extending seat and a table above said flooring, said seat being disposed in the path of movement of the door for said compartment and hingedly mounted at one end on one of said side walls, whereby it may be swung into an inoperative position to permit opening of said compartment door.

HARVEY A. COOK.

References Cited in the file of this patent

UNITED STATES PATENTS

| Number | Name | Date |
| --- | --- | --- |
| 1,420,298 | White | June 20, 1922 |
| 1,984,681 | Jackson | Dec. 18, 1934 |
| 2,006,477 | Pendry | July 2, 1935 |
| 2,071,489 | Alvord | Feb. 23, 1937 |